United States Patent [19]

Cherrington et al.

[11] Patent Number: 4,679,637

[45] Date of Patent: Jul. 14, 1987

[54] APPARATUS AND METHOD FOR FORMING AN ENLARGED UNDERGROUND ARCUATE BORE AND INSTALLING A CONDUIT THEREIN

[76] Inventors: Martin D. Cherrington; William D. Cherrington, both of Cherrington Corp., 7398 San Joaquin, Sacramento, Calif. 95820

[21] Appl. No.: 853,344

[22] Filed: Apr. 17, 1986

Related U.S. Application Data

[63] Continuation-in-part of Ser. No. 733,723, May 14, 1985, abandoned.

[51] Int. Cl.$^4$ .............................. E21B 7/04; E21B 7/08
[52] U.S. Cl. ......................................... 175/61; 175/53; 175/67; 175/73; 175/231; 175/325; 175/424
[58] Field of Search ........................ 175/19, 21, 53, 61, 175/62, 67, 73, 107, 162, 203, 231, 320, 325, 350, 406, 424; 405/184

[56] References Cited

U.S. PATENT DOCUMENTS

| | | | |
|---|---|---|---|
| 862,972 | 8/1907 | Jones | 175/422 R X |
| 2,349,033 | 5/1944 | Elliott | 255/69 |
| 2,783,972 | 3/1957 | Fehlmann | 175/67 X |
| 3,077,936 | 2/1963 | Arutunoff | 175/107 X |
| 3,382,938 | 5/1968 | Williams, Jr. | 175/61 X |
| 3,431,991 | 3/1969 | Mikels | 175/21 |
| 3,508,620 | 4/1970 | Pennington | 175/53 |
| 3,536,151 | 10/1970 | Aarup | 175/422 R |
| 3,720,272 | 3/1973 | Hunter | 175/61 |
| 3,746,108 | 7/1973 | Hall . | |
| 3,873,156 | 3/1975 | Jacoby | 175/231 X |
| 3,878,903 | 4/1975 | Cherrington | 175/45 |
| 3,881,561 | 5/1975 | Pols et al. | 175/422 R X |
| 3,894,402 | 7/1975 | Cherrington | 61/72.4 |
| 3,967,689 | 7/1976 | Cherrington | 175/391 |
| 4,003,440 | 1/1977 | Cherrington | 175/61 |
| 4,043,136 | 8/1977 | Cherrington | 61/72.7 |
| 4,051,911 | 10/1977 | Cherrington | 175/107 |
| 4,078,617 | 3/1978 | Cherrington | 173/1 |
| 4,117,895 | 10/1978 | Ward et al. | 175/53 |
| 4,319,648 | 3/1982 | Cherrington | 175/53 |
| 4,384,624 | 5/1983 | Duke et al. | 175/19 |
| 4,401,170 | 8/1983 | Cherrington | 175/73 |
| 4,485,879 | 12/1984 | Kamp et al. | 175/61 |
| 4,501,336 | 2/1985 | Kemp et al. | 175/61 |

OTHER PUBLICATIONS

Article "Pipeline Digest", Sep. 18, 1978, pp. 8 and 9.
Pet. Ext. Serv./Univ. Texas, 1969—"Controlled Directional Drilling", Unit III, Lesson I, (pp. I-19-I-24).
Article–Oil & Gas Journal/10-1-84—"Directional–Drilling Technique is Proposed for Installing Marine Pipelines in arctic Areas".
Reynolds Metals Co.—Table 1—Properties-Reynolds Aluminum & Steel Drill Pipe (pp. 6-7)/Table 3-Reynolds Aluminum Drill Pipe 4½' (pp. 10-11)/Table 6—Reed Alstan Tool Joints/Reynolds Aluminum Drill Pipe.

*Primary Examiner*—Stephen J. Novosad
*Assistant Examiner*—John F. Letchford
*Attorney, Agent, or Firm*—Vinson & Elkins

[57] ABSTRACT

An apparatus and method for drilling a pilot bore hole (B) along an underground arcuate path (P) between two surface locations (O, E). The pilot bore hole (B) is drilled in one direction with a drill string (10) having a leading pipe section (10A) of a reduced diameter to provide increased flexibility. Upon completion of the pilot bore hole (B), a reamer (48) connected to a product conduit (46) is connected to the drill string (10). Drill string (10) pulls the reamer (48) and product conduit (46) along the pilot bore hole (B) in an opposite direction for enlarging the bore hole (B) to receive the product conduit (46). A spud bit (34) has a flat or blunt leading end portion (34A) with a discharge opening (34D) therein to discharge high velocity drilling fluid into the formation at a location offset from the longitudinal axis of the drill string (10) to assist in guiding the drill string (10). An in-hole hydraulic motor (70) is provided in an embodiment (FIG. 7) for rotating the drill bit (78), and the longitudinal axis of a drive shaft (74) for the drill bit (78) is offset from the longitudinal axis of the drill pipe string (10) to assist in a deviation of the drill bit (78).

50 Claims, 11 Drawing Figures

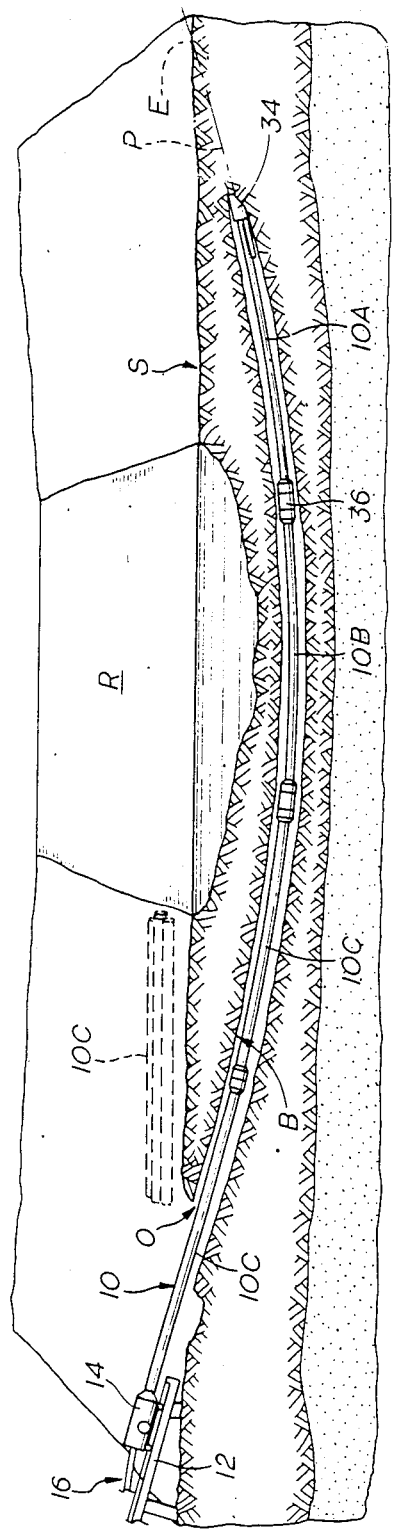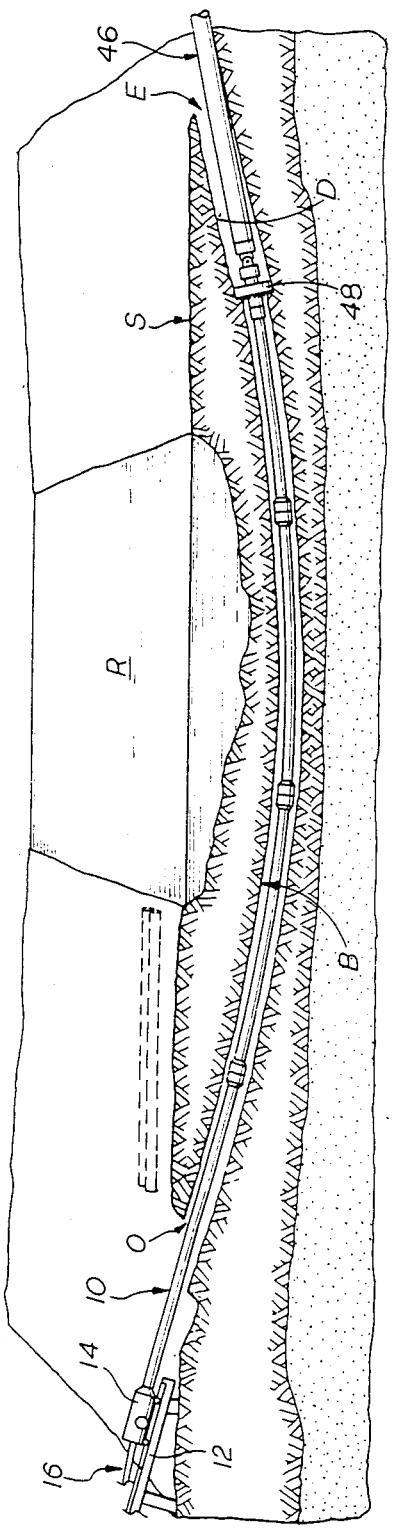

APPARATUS AND METHOD FOR FORMING AN ENLARGED UNDERGROUND ARCUATE BORE AND INSTALLING A CONDUIT THEREIN

CROSS REFERENCE TO RELATED APPLICATION

This application is a continuation-in-part of application Ser. No. 733,723, filed May 14, 1985 now abd.

BACKGROUND OF THE INVENTION

The present invention relates to an apparatus and method for drilling a pilot bore hole along an underground arcuate path between two surface locations, and then enlarging the pilot bore hole for installing a conduit therein, such as pipe, casing, cable, or a pipeline.

Heretofore, directional drilling apparatus has been provided for drilling an underground pilot bore hole along an arcuate path between two surface locations, and then enlarging the pilot bore hole for receiving a product conduit, such as a pipeline therein. A common apparatus and method has utilized a drill pipe string of relatively small diameter less than two (2) inches with a drill bit thereon forming a relatively small diameter pilot bore hole, which is followed by a relatively large diameter washover pipe such as around five (5) inches in diameter or more, in concentric relation to the drill string and having cutting blades on the leading end thereof for enlarging the initial pilot bore hole. Upon completion of the pilot bore hole as enlarged by the washover pipe, the drill string has been removed and the washover string then connected to a reamer at the exit end for pulling the reamer and connected product conduit along the initial bore hole for reaming to a desired diameter to receive the product conduit.

Thus, the method and apparatus employed heretofore for forming a pilot bore hole normally has included two separate cutting or drilling steps prior to the reaming operation, the first cutting step being the drilling of a small diameter bore hole from a drill bit with a relatively small diameter light weight drill string, and the second cutting step resulting from an enlarging of the bore hole by the washover string in concentric relation to the drill string. Thereafter, the reaming operation has taken place to enlarge the pilot bore hole to receive the product conduit or pipe.

Heretofore, a relatively small diameter drill pipe string of around one and three-fourths (1¾) inches in diameter has been utilized for such pilot bore holes as it was found desirable to have a relatively lightweight drill pipe or string, particularly when drilling under streams where sand and clays are normally encountered with water also being present at times. Under the weight of the drill string, the drill string could sink under certain conditions and it was accepted as common practice in the industry to employ a relatively small diameter drill string in order to keep the weight of the entire drill string at a minimum and to provide flexibility. Such a small diameter drill pipe string thus necessitated the use of a separate washover string in order to provide the necessary strength for the subsequent reaming operation and pulling of the production conduit through the enlarged bore hole.

The utilization of two separate cutting steps or procedures for forming the pilot bore hole prior to the reaming operation results in a costly operation.

Other directional drilling apparatus and methods for underground arcuate bores or openings not employing a washover pipe following the drill string have utilized other types of reamers or cutters which enlarge the initial pilot bore hole by a cutter or reamer moving in the same direction as the initial drill pipe string forming the pilot bore hole.

SUMMARY OF THE INVENTION

This invention is directed to an apparatus and method for drilling in one direction of travel a pilot bore hole along an underground arcuate path between two earth surface locations, and then enlarging in an opposite direction of travel the initial pilot bore hole for receiving a product conduit therein. The apparatus and method utilized to accomplish this comprise two separate cutting operations, the first being a pilot bore drilled by a conventional drill pipe string but utilizing at least for a majority of the drill pipe sections an increased diameter of around three and one-half (3½) inches which increases the strength of the pipe string as compared with common industry practice heretofore. The increased strength drill string thus eliminates the necessity of having a separate washover string as the increased drill string strength is adequate for the torsional or rotational stresses developed in the subsequent reaming operation and pulling of the production conduit through the enlarged bore hole.

The drill string is thrust along a predetermined arcuate path to form an initial pilot bore hole of a relatively small diameter, such as around five (5) inches, for example. After the drilling of the initial pilot bore hole and exit of the drilling string from the exit surface opening, a reamer and connected production conduit are attached to the drill string, and the drill string is then pulled back through the pilot bore hole in an opposite direction of travel with the reamer enlarging the bore hole to a diameter sufficient to receive the production conduit therein. The enlarged opening may be around thirty (30) inches in diameter for a production conduit, such as a pipeline, around twenty (20) inches in diameter thereby providing a five (5) inch annulus between the production conduit and the enlarged opening.

In order to provide the desired flexibility in the leading end pipe section of the drill string, such as is desirable when relatively soft formations are encountered, the leading end pipe section having the drill bit thereon may be provided of a diameter smaller than the diameter of the regular drill string sections, or a different wall thickness or different type of material may be utilized for the leading pipe section to provide the desired flexibility. Preferably, the drill string sections except for the leading pipe sections are over around three (3) inches in diameter and sections of three and one-half (3½) inches in diameter have been found satisfactory. The leading drill pipe section of this invention is preferably below three (3) inches in diameter. Thus, the leading drill pipe section or sections may be provided with an increased flexibility and the length of the leading end section may be varied. Any reduced diameter drill pipe section or sections are preferably removed at the surface location adjacent the exit opening prior to the attachment of the reamer and production conduit to the drill string. Thus, a constant diameter drill string may be provided for pulling the reamer and following product conduit through the pilot bore hole in a reverse or opposite direction of travel.

Under certain conditions it may be desirable, such as for relatively long arcuate paths, to provide drill pipe sections in the drill string of an increasing strength from the leading end thereof to the power means for thrusting the drill bit and/or rotating the drill string in the reaming operation. The increased strength pipe sections compensate for the increasing friction of the drill string along its length. Drill pipe sections having an increased strength may be provided independently of any increased flexibility, if desired. In some situations, it may be desirable to have less flexibility on the leading end drill pipe sections.

Another feature of this invention utilizes an in-hole hydraulic motor positioned within the leading drill string section for rotating the drill bit, such as might be desirable where relatively hard formations are encountered. When a leading pipe section for the drill bit is provided utilizing the in-hole hydraulic motor, the longitudinal axis of the drive shaft for rotating the drill bit is parallel t but offset from the longitudinal axis of the drill string. This offset results in the deviation or deflection of the drill bit a predetermined amount in the desired direction of travel as the leading pipe section rides along the surface of the pilot bore hole formed by the drill bit opposite the desired direction of deviation.

In a separate embodiment of this invention, a drill string is provided consisting of a plurality of connected pipe sections with each pipe section being formed of a high strength flexible alloy material, such as aluminum, having an inside diameter of around four (4) inches. The use of a material such as aluminum which is non-magnetic or non-ferrous does not affect sensitive monitoring or surveying equipment which may be positioned within the drill string, particularly since a relatively large diameter drill pipe is utilized. A high strength large diameter drill pipe section permits the use of a relatively large diameter drill bit and also provides sufficient strength for pulling the reamer and/or production conduit back through the hole after the pilot hole has been drilled.

Additionally, it has been found with certain types of formations that it is advisable to add a separate step to the method or process for installing the production conduit by first pulling the reamer back through the drilled pilot hole without the production conduit. Then, pushing the reamer back through the enlarged empty hole, and then attaching the production conduit to the reamer for installation of the production conduit. This method ensures that the small diameter pilot hole can be enlarged without hitting an obstruction, and requires less power for pulling the production conduit through the hole since the reaming operation is completed.

Another feature of this invention is the use of a spud bit having fluid discharge nozzle means at its leading end with the center or longitudinal axis of the fluid stream or jet discharged from the bit being offset from the longitudinal axis of the drill string for guiding the drill string. The drill string may also be rotated through a selected defined angle to aid in guiding the drill string. In the event more than one discharge nozzle is provided, the center or longitudinal axis of the mass of drilling fluid being discharged is offset from the longitudinal axis of the drill string in the desired travel path.

An object of this invention is to provide an apparatus and method in which a conventional drill string comprising a plurality of drill pipe sections is thrust along an arcuate path to the desired surface exit opening, and then a reamer and production conduit are pulled, upon connection to the drill string, back through the pilot bore hole in a minimum of time.

A further object is to provide a drill string for drilling the pilot bore hole having a leading pipe section with an increased flexibility for drilling through relatively soft formations, or for utilizing various lengths of leading drill pipe sections as may be desired.

Another object is to provide a spud bit on the leading end of the drill string having fluid discharge nozzle means for discharging high velocity drilling fluid in a jet or stream having its center offset from the longitudinal axis of the drill string to guide the drill string.

Another object is to provide a drill string for drilling the pilot bore hole having drill pipe sections of increasing strength to compensate for the increasing friction of the drill string along the pilot bore hole.

An additional object is to provide in a drill string for drilling the pilot bore hole an in-hole hydraulic motor for rotating the drill bit relative to the drill string, and having its rotational axis parallel but offset from the longitudinal axis of the drill string to provide a desired deflection or deviation to the drill bit.

Another object is to provide a spud bit for drilling a bore hole having a novel shape particularly adapted for use with discharge nozzles for a high velocity drilling fluid.

Other objects, features, and advantages of this invention will become more apparent after referring to the following specification and drawings.

DESCRIPTION OF THE INVENTION

FIG. 1 is a perspective schematic cross-section of the initial drilling operation in drilling an inverted arcuate pilot hole or bore from an earth entry opening to an earth exit opening and utilizing the apparatus and method of the present invention;

FIG. 2 is a perspective schematic cross-section similar to FIG. 1 but showing the enlarging of the initial pilot bore hole by a reamer and the pulling of the production conduit and reamer therethrough by the initial drill string;

Figure 3:
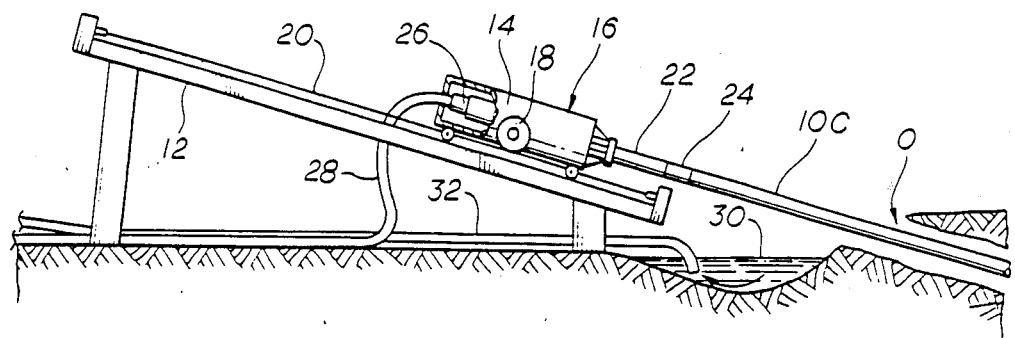
FIG. 3 is a schematic side elevation, partly in section, of the entrance end of the pilot bore hole showing the thrust and rotating device for the drill string.

Referring now to the drawings for a better understanding of our invention, reference is made to FIG. 1 in which an arcuate pilot bore hole is illustrated at B extending along an underground path shown at P. Path P extends from an earth surface entrance opening O to an earth surface exit opening E underneath an obstruction shown as a river R.

While exit opening E is shown as a surface exit opening in the drawings, the terms "exit opening", "surface exit opening" or "surface location" as used in the specification and claims shall be interpreted as including an opening beneath the surface at which a product conduit is connected to the drill string to be pulled through the bore hole, such as an underground cable.

A drill string indicated generally at 10 includes a leading end pipe section 10A of a small diameter, an adjacent end section 10B of an intermediate diameter, and following pipe sections 10C of uniform diameter. Drill string 10 is utilized to drill small diameter pilot bore hole B along path P. A plurality of lengths or sections of pipe string 10 ar normally positioned adjacent entrance opening O such as shown at 10C in broken lines in FIG. 1.

As pointed out above, drill string pipe sections utilized heretofore in association with a separate washover pipe string have been of a diameter around one and three-fourths (1¾) inches since the washover string was relied upon for rotation of the reamer and pulling of the production conduit. However, the present invention eliminates the washover pipe and instead, provides a higher strength drill pipe string having a diameter of three and one-half (3½) inches. Such an increased diameter provides a stiffer pipe string than used heretofore.

Under certain types of conditions encountered such as relatively soft formations, it is desirable to have a smaller, more flexible leading end section on drill string 10 in order to achieve easily the necessary or desired deflection. As shown in FIG. 1, sections 10C are of the normal or regular diameter of three and one-half (3½) inches. However, leading section 10A is formed of a smaller diameter pipe and is around two and three-quarters (2¾) inches in diameter, while pipe section 10B is of an intermediate diameter of two and seven-eighths (2⅞) inches. By using a drill string with two or more graduated diameters, different length pipe sections may be easily utilized as might be desirable under certain conditions, and this has been found to be particularly useful where relatively soft ground conditions are encountered where a smaller, more flexible leading end pipe section is desirable for obtaining the desired deflection necessary to follow arcuate path P.

While increased flexibility is obtained by having pipe sections 10A and 10B of a smaller diameter than sections 10C, it is to be understood that sections 10A and 10B could, if desired, provide increased flexibility by other means, such as by being made of a more flexible high strength material without being of a reduced diameter, or by having a different wall thickness without any change in external diameter.

It is also desirable for a relatively long arcuate path P to have trailing pipe sections of the drill string of a strength greater than the leading pipe sections. During a thrust action, the drill string is pushed from the entrance opening O along the bore hole B, and portions of the length of the drill string are in contact with the surface of the bore hole B during the pushing action thereby to generate sliding frictional resistance which has to be overcome. The greater the length of the drill string, the greater the amount of sliding friction. Likewise, upon rotation of the drill string during a reaming action, the torsional or rotational stresses in the drill string are higher at the power source providing rotation. This, it is desirable to have drill pipe sections adjacent the power source of an increased strength. It may be desired to have drill pipe sections of graduated increasing strength from the drill bit end to the power source. Further, it may not be desirable to have the diameter of the drill string greater than around three and one-half (3½) inches, or to have the leading pipe sections of an increased flexibility. Under such conditions, the strength of the drill pipe sections, particularly those sections adjacent the power means for thrusting the drill bit along a relatively long arcuate path P, such as over five hundred (500) feet in length, are preferably of an increased strength. Such increased strength could be provided, for example, by making the pipe sections of high strength materials or increasing the wall thickness of such pipe sections. The utilization of drill pipe sections with different strengths thereby eliminates the necessity of having a separate washover pipe following the drill string in concentric relation, as a specific drill string section can be designed for the specific strength required at its location in a drill string.

As shown in FIG. 3, an inclined ramp is shown at 12 and has a hydraulic motor 14 mounted on a carriage 16 for axial movement along a suitable guideway on ramp 12, such as by a suitable pulley or cog wheel 18 moving along a taut cable 20, for example. Motor 14 may be used, selectively, to rotate a connecting shaft 22 which is connected at one end to a joint 24 attached to section 10C of drill string 10, thereby to rotate drill string 10, if desired. Shaft 22 is connected at its other end to a swivel 26 which is in turn connected to a hose 28 through which a suitable drilling fluid is circulated. Carriage 16 reciprocates back and forth as drill pipe sections are added by making and breaking joint 24.

Drilling mud circulated through hose 28 is supplied to the drill pipe and out suitable fluid passageways (not shown) at the drill bit for possible return to a sump shown at 30 adjacent the end of entrance opening O which receives the drilling fluid and cuttings from the drilling operation. A suitable hose shown at 32 returns the drilling fluid or mud for removal of the cuttings, and again providing drilling fluid to hose 28 as is well known in the art.

Drill string 10 is standard and normally made up of a plurality of drill pipe sections which are added to the drill pipe string at connector 24. The pipe sections are advanced in the earth by advancing hydraulic motor 14 connected to a suitable source of hydraulic fluid (not shown) down ramp 12.

Figure 5:
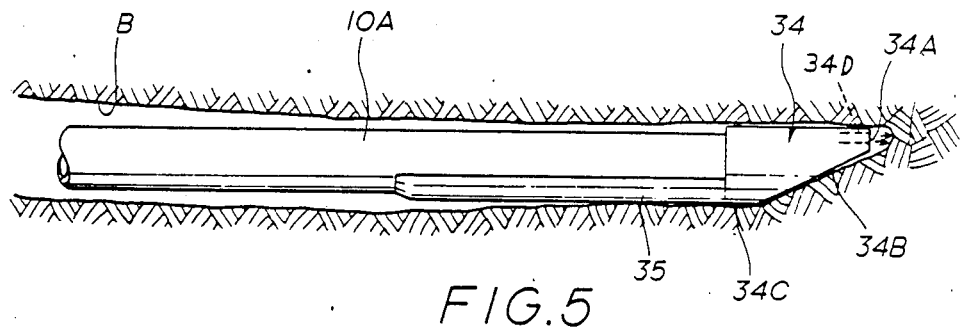
FIG. 5 is a schematic side elevation of the leading end of the drill string showing a deflecting spud bit for forming the initial pilot bore hole shown in FIG. 1.
Figure 5A:
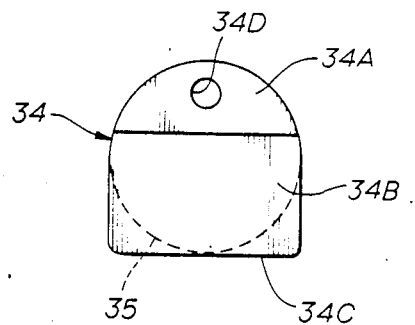
FIG. 5A is an end elevation of the spud bit shown in FIG. 5.

Leading small diameter pipe section 10A has a spud bit 34 on its leading end. Spud bits of various types are well known generally in the art for directional drilling or the like. However, spud bit 34 as shown in FIGS. 5 and 5A is particularly adapted in the present invention for discharging a high velocity drilling fluid from its leading end at a location closely adjacent the formation thereby to obtain a highly effective excavating action to advance the drill string. It is important to note that spud bit 34 preferably discharges fluid in a direction parallel to the axis of the drill string as shown by the arrows in FIG. 5. For this purpose, spud bit 34 has a flat or planar forward end portion 34A, an inclined intermediate planar end portion 34B leading from forward end portion 34A to form a ramp, and a rear planar shoulder 34C. An arcuate shoe or wear plate 35 is secured to the outer periphery of pipe section 10A adjacent rear shoulder 34C. It is noted that bore hole B has a diameter larger than the maximum diameter of any portion of the drill string moving through the hole.

A discharge opening 34D or discharge nozzle which may be threaded within end portion 34A to form opening 34D is provided in the face formed by planar end portion 34A. Thus, opening 34D is positioned at the leading end of spud bit 34 directly adjacent the formation to be excavated for discharging a jet of high velocity drilling fluid therein. The drilling fluid may be pressurized from around one hundred (100) psi to around two thousand (2000) psi, for example. The longitudinal or discharge axis of discharge nozzle 34D is parallel to, but offset from, the longitudinal axis of drill string 10 to aid in deflecting end section 10A in the direction of the offset. Discharge opening 34D is of sufficient depth such that pressurized fluid is preferably discharged therefrom in a direction parallel to the longitudinal axis of drill string 10 to erode and/or excavate the formation. It is apparent that end section 10A may be guided also by rotation of the drill string through a defined angle. To provide an effective guiding action, the offset of nozzle or opening 34D, or the offset of the center of the volume of fluid being discharged in the event more than one discharge opening is utilized, should be at least greater than around three-fourths ($\frac{3}{4}$) inch. As an example, with a spud bit having a diameter of five (5) inches as shown in FIG. 5A, nozzle 34D is around three-eighths ($\frac{3}{8}$) inch in diameter and offset one (1) inch from the longitudinal center line of section 10A.

It may be desirable under certain conditions to have more than one discharge nozzle, but in any event, the center of the combined jets of drilling fluid being discharged is parallel to and preferably offset from the longitudinal axis of section 10A in the desired travel path. The ramp formed by inclined planar end portion 34B, rear shoulder 34C, and shoe 35 ride along the surface of bore hole B opposite the desired direction of deviation and aid in guiding pipe section 10A along travel path P. Under certain conditions it may be desirable to have a ramp to aid in guiding pipe section 10A, such as ramp 34B, extending across the entire leading end of the spud bit without any separate planar end portion such as shown at 34A. Spud bit 34 thus moves along path P in a thrusting action without being rotated except for a predetermined partial rotation to obtain angular orientation to guide pipe section 10A.

While spud bit 34 has been developed primarily for use in drilling a pilot bore hole along an arcuate path between two surface locations, it is obvious that spud bit 34 may be utilized for other types of directional or downhole drilling as well known in the art.

Arcuate path P can be controlled or guided without withdrawing of the drill string from the earth primarily by orientation of spud bit 34 by a partial rotation of the drill string through a defined angle, but such control may also be dependent on such factors or parameters, for example, as the thrust on the drill string and the volume of drilling mud passed to the drill string, as is well known in the art. For further details concerning the deviation or deflection of the drill string for directional drilling or the like, as well known in the art, reference is made to U.S. Pat. No. 2,646,254 dated July 21, 1953 and U.S. Pat. No. 3,713,500 dated Jan. 30, 1973, as examples.

Figure 4:
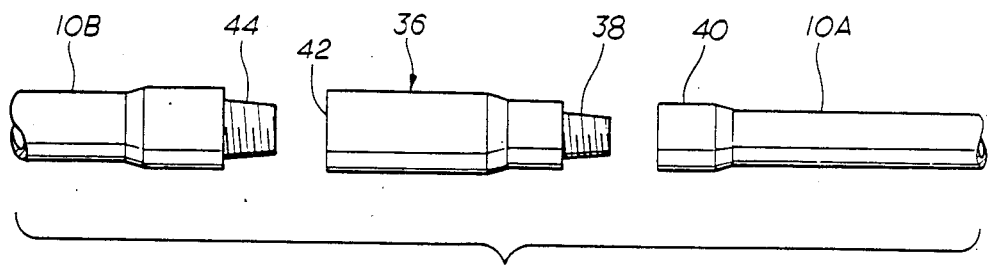
FIG. 4 is an exploded view of a crossover sub for connecting adjacent drill string lengths or sections of different diameters.

For connecting two pipe sections of different diameters, such as shown in FIG. 4, a crossover sub indicated generally at 36 is illustrated having a threaded male end 38 adapted to be threaded within a female end 40 on pipe section 10A, and having a female connection 42 on an opposite end thereof adapted to receive the male threaded end 44 of adjacent pipe section 10B. A similar crossover sub 42 is provided between sections 10B and 10C. The diameter of bore B is sufficiently larger than the diameter of pipe string 10 to provide an annulus to permit the discharge of the drilling fluid and cuttings from bore B. Utilizing a drill pipe string of a maximum diameter around three and one-half ($3\frac{1}{2}$) inches, bore B may be around five (5) inches in diameter to provide adequate clearance for the flow of cuttings and drilling fluid from bore B.

Figure 6:
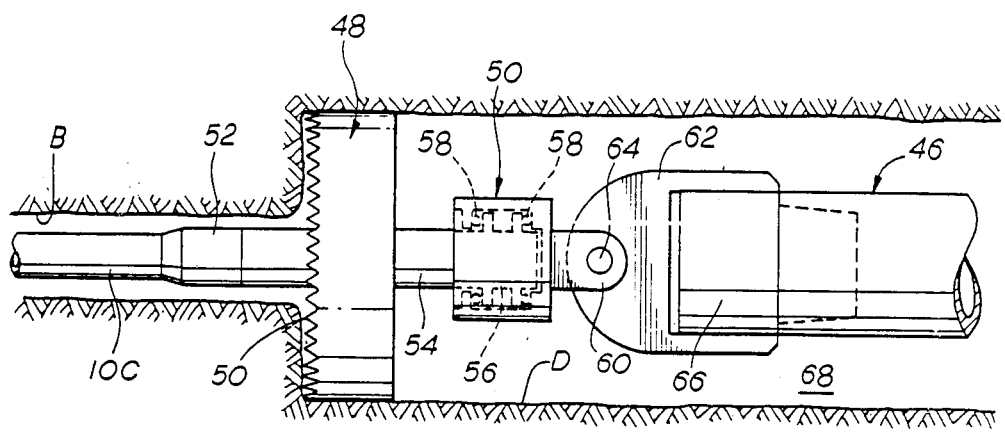
FIG. 6 is a schematic side elevation of the end of the drill string connected to a reamer and production conduit at the exit opening of the small diameter pilot bore hole for pulling the reamer and production casing through the enlarged opening formed by the reamer.

When leading drill section 10A reaches exit opening E and pilot bore hole B is completed, it is now necessary to enlarge the pilot bore hole for receiving the production conduit shown in the drawings as a pipeline 46. The production conduit may be any of several types of continuous conduit, such as, for example, casing, pipe, cables, or the like, and more than one production conduit may be installed in enlarged opening D. For this purpose, a reamer indicated generally at 48 is shown in FIG. 6. Reamer 48 has cutting teeth 50 thereon and is coupled at 52 to the end of the first drill section 10C of the uniform diameter of three and one-half ($3\frac{1}{2}$) inches for rotation by drill string 10 and motor 14. The end drill pipe section 10A, or at least the drill bit and any associated instrumentation (not shown), is removed for connection of drill string 10 to reamer 48. It may be desirable to remove both sections 10A and 10B from the end of the drill string 10 prior to the connection of reamer 48 if it is desired that drill string 10 be of a uniform diameter and strength for rotating reamer 48 and pulling production pipe 46 through bore hole B.

Drilling mud continues to be supplied through drill string 10 and pipe section 10C to the cutting area adjacent reamer 48 where it is discharged through suitable perforations as is well known. Shaft 54 extends from reamer 48 and has an enlarged diameter end thereof at 56 received within a swivel indicated generally at 50 so that the reamer 48 can rotate relative to production pipe 46. An equally satisfactory and effective method and means could be utilized by a separate threaded sleeve connection between shaft 54 and reamer 48 as shown in FIG. 3 by connector 24. Enlarged end 56 of shaft 54 is mounted within bearings 58 on opposite sides thereof for transmitting thrust to swivel 50 and to permit relative rotation between reamer 48 and production pipe 46. Preferably pipe 46 enters the bore hole B without any rotation at all although in some instances it may be desirable to rotate a production conduit being installed. Swivel body 50 has a clevis defining two spaced arms 60 on the side thereof opposite shaft 54, and an extension 62 on a sleeve 66 is pivotally connected to arms 60 by pin or bolt 64.

Sleeve 66 is shown in FIG. 6 threaded onto an end of production pipe 46 which is formed of a plurality of welded sections as common for pipelines. It is to be understood, however, as well known in the art, that sleeve 66 could be secured by other means to a production conduit, such as, for example, by welding, bolted connection, or other types of threaded connections. Reamer 48 is of a diameter larger than a diameter of production casing 46 so as to form a suitable annulus 68 in the enlarged diameter opening D. For example, if production casing or pipe 46 is of a diameter of twenty (20) inches, reamer 48 may be of a thirty (30) inch diameter to provide a five (5) inch annulus 68 about the periphery of pipe 46. Annulus 68 may be utilized for cementing of conduit 46 in position.

After pipe 46 has been pulled through the enlarged opening D from surface location at opening O, sleeve 66 is removed from production casing 46 and production casing 46 may be cemented or secured in position.

Figure 7:
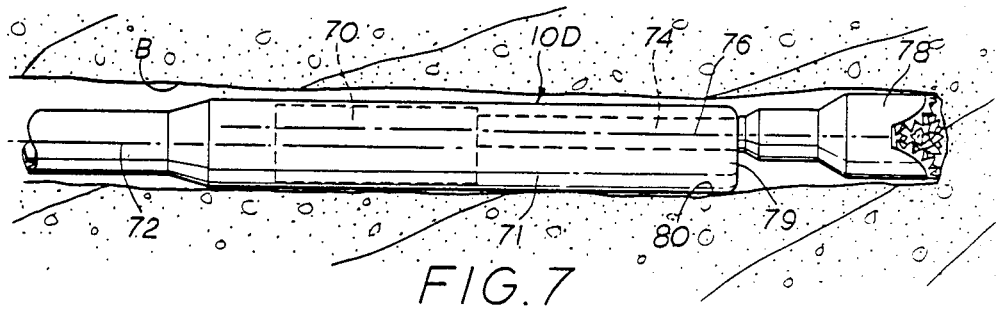
FIG. 7 is a schematic cross-section showing a modified drill bit arrangement in which an in-hole motor driven by drilling fluid is utilized, such as may be required for certain types of formations or bore hole lengths.

Referring to FIG. 7, a modified form of end section is shown at 10D for an in-hole motor 70 which is used where relatively hard formations may be encountered. In-hole motor shown at 70 is positioned within an enlarged diameter end portion 71 of drill string section 10D and is a hydraulic motor driven by drilling fluid received by the drill string. The longitudinal axis of the drill string is shown along line 72 while the longitudinal axis of the rotating drill bit shaft 74 is shown at 76. A drill bit 78 is connected to the end of shaft 74 for rotation therewith. While hydraulic motor 70 is shown schematically in FIG. 7 as being separate and larger than shaft 74, it is to be understood, as well known in the art, that motor 70 and shaft 74 may be combined and of a single continuous diameter such as illustrated schematically by shaft 74.

It is noted that axis 76 is offset from but parallel to axis 72 to aid in deflecting end section 10D a predetermined amount in the desired direction of travel. While axis 76 is shown as offset above axis 72 in FIG. 7 to deflect end section 10D upwardly, it may be offset laterally or downwardly by limited rotation of the drill string through a defined angle if a different path of travel is desired. It is noted that other parameters may be utilized to aid in the control of direction of the drill string along the desired travel path P as indicated above for the embodiment shown in FIG. 5, and, in addition, the speed of rotation of drill bit 78. Enlarged diameter end portion 71 has a beveled leading end 79 which rides along the surface 80 of bore B opposite the direction of the offset and as a result of the offset directs bit 78 in the direction of the offset. The amount of offset along with the other parameters set forth for the embodiment of FIG. 5, and the speed of rotation of drill bit 78, determine the amount of deviation or deflection. Motor 70, as well known in the art, has a conventional stator and rotor with drive shaft 74 connected to the rotor. Drilling fluid passes through the rotor and stator to effect a rotation of shaft 74 and drill bit 78, as well known in the art.

While the bore hole B formed by drill bit 78 is illustrated diagrammatically in FIG. 7 of a diameter not greater than the diameter of enlarged end portion 71, it is to be understood that the diameter of bore hole B formed by bit 78 is always of a diameter greater than the diameter of end portion 71 in order to provide a suitable annulus for the flow of drilling fluid and cuttings from drill bit 78.

Figure 8:
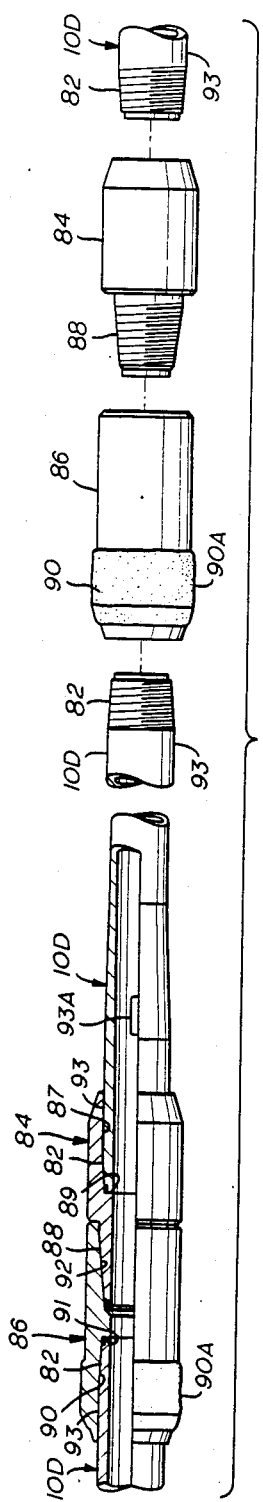
FIG. 8 illustrates in side elevation, partly in section, a plurality of drill pipe sections formed of large diameter aluminum pipe connected by suitable tool joints.

FIG. 8 shows a portion of a drill string having a plurality of connected pipe sections 10D. Each drill pipe section 10D is of a length of around thirty (30) feet and is formed of a high strength flexible material. The end portions of pipe section 10D are of an increased thickness and have externally threaded tapered ends 82. Pipe section 10D is preferably formed of a high strength aluminum alloy material. A pipe section 10D which has been found to be satisfactory is a four and one-half (4½) inch aluminum drill pipe manufactured by Reynolds Metals Company, Richmond, Va. and having a wall thickness of around one-half (½) inch, an inside diameter of around three and one-half (3½) inches, and a Young's modulus of elasticity of ten million psi. Such a pipe section has been found to be adequate to provide a deviation of around five (5) degrees which permits a deflection of around fifteen (15) inches for a thirty (30) foot length of pipe section.

For connecting pipe sections 10D to each other, male and female tool joints indicated respectively at 84 and 86 are provided. One end 82 of each section 10D has a male tool joint 84 connected thereto and the other opposite end 82 has a female tool joint 86 connected thereto. Tool joints 84 and 86 are formed of a high strength steel alloy material.

Tool joint 84 has an internally threaded female end portion 87 and an externally threaded male portion 88 with tapered external threads thereon. A shoulder 89 forms an abutting surface for the adjacent end of pipe section 10D.

Female tool joint 86 has an internally threaded female end portion 90 having a hardened outer surface area indicated at 90A for wear purposes and receiving an associated end 82 of pipe section 10D. A shoulder 91 forms an abutting surface for the end of section 10D. A female end portion 92 of tool joint 86 has tapered internal screw threads to receive a mating end portion 88 of tool joint 84. Upon a make-up of the connection, an interference fit is provided (1) between the mating screw threads, (2) between shoulders 89 and 91 and the abutting ends of pipe sections 10D, and (3) between the smooth outer surfaces 93 of pipe sections 10D adjacent their threaded ends and the adjacent tool joints. Thus, the ends of pipe section 10D are firmly gripped to provide a pressure tight assembly and efficient transfer of tension, torsion, bending and compression loads between pipe sections 10D and tool joints 84 and 86.

Since a relatively large diameter drill pipe is provided, adequate space exists for the utilization of suitable electronic survey equipment or the like indicated schematically at 93A which may be positioned within the drill pipe section adjacent the leading end of the drill string to provide signals to the surface for indicating the position of the drill string and the direction of travel thereof along the underground arcuate path.

It has been found with certain types of formations that it is advisable to add a separate step to the method or process for installing the production conduit, particularly where an obstruction might be encountered in the formation when reaming the large diameter hole. If an obstruction is encountered while reaming the large diameter hole, it is desirable that the production conduit not be connected to the reamer so that the reamer will be freely movable for removal of the obstruction. For this purpose, under certain types of operation, the reamer is pulled through the pilot hole for enlarging the opening without having the production conduit connected thereto. After the pilot hole has been enlarged, the reamer is then pushed back through the empty hole to the exit side and the production conduit is then attached to the reamer. Then, the production conduit and reamer are pulled through the enlarged hole for installation of the production conduit thereby to insure that the enlarged hole is clear of any obstructions. Also, less power is required to pull the production conduit into place if the hole has been previously enlarged.

Figure 10:
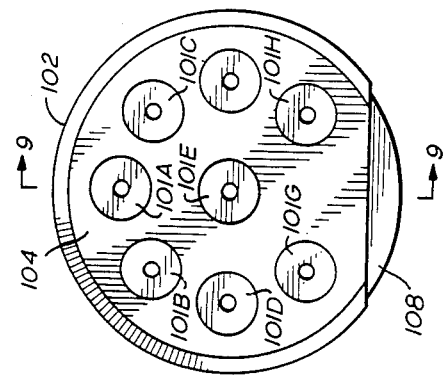
FIG. 10 is a front elevation of the modified spud bit shown in FIG. 9.
Figure 9:
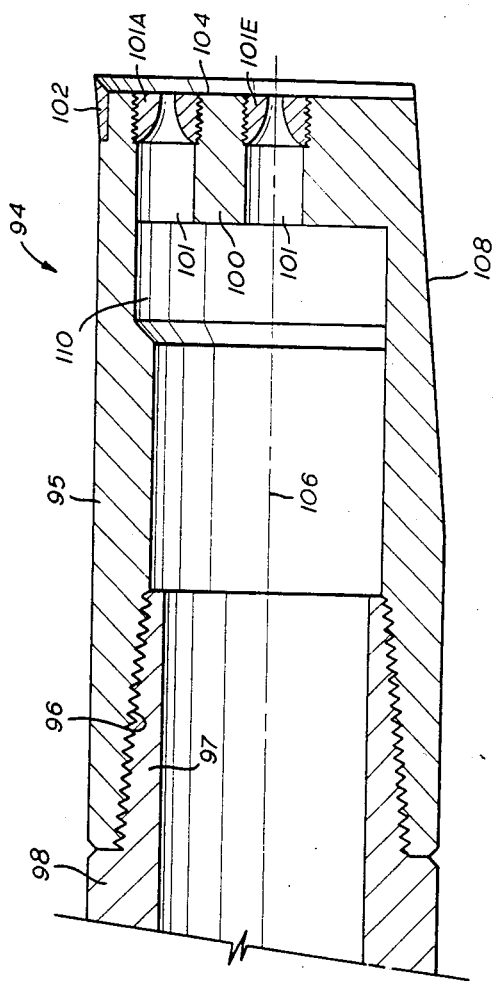
FIG. 9 is a side elevation of a modified spud bit showing a plurality of fluid discharge nozzles therein.

Referring also to FIGS. 9 and 10, an improved or modified spud bit is shown generally at 94 and includes a generally tubular body 95 having an internally threaded end 96 threaded onto an externally threaded end 97 of a suitable connecting tool joint 98 which is connected at its opposite end to a drill pipe section 10D. The end of bit 94 is closed at its leading end to form a head 100 having a plurality of axis openings therein with their longitudinal axes parallel to the longitudinal axis of the drill string. A ring 102 is secured to the leading end of bit 94. Body 95 has a plurality of fluid nozzles designated 101A, 101B, 101C, 101D, 101E, 101F, 101G, and 101H threaded therein in alignment with openings 101, each nozzle having a fluid discharge port for discharging drilling fluid in a high velocity jet or stream directly against the formation for eroding the formation. Body 95 forms a planar leading face 104 extending in a plane at right angles to the longitudinal axis of the drill string indicated at 106 and an inclined planar portion 108 extends rearwardly from leading face 104 at an angle A of around five (5) degrees with respect to the longitudinal axis 106 of the drill string.

It is noted that the center of the combined jets of drilling fluid from nozzles 101B through 101H would be balanced and parallel to the longitudinal axis 106 of the drill string. However, the addition of discharge nozzle 101A raises and offsets the center of the combined jets or mass of drilling fluid to a position above axis 106 and thus permits the drill string to be guided. The rotation of the drill string through a defined predetermined angle permits guidance or steering of the drill string. Drilling fluid enters tubular body 95 and a fluid chamber 110 from the drill string and is discharged through nozzles 101A–101H from leading planar face 104 of drill bit 94.

While preferred embodiments of the present invention have been illustrated in detail, it is apparent that modifications and adaptations of the preferred embodiments will occur to those skilled in the art. However, it is to be expressly understood that such modifications and adaptations are within the spirit and scope of the present invention as set forth in the following claims.

What is claimed is:

1. A method for drilling an arcuate underground pilot bore hole along a predetermined arcuate path in one direction of travel between two surface locations, and then enlarging the pilot bore hole in an opposite direction of travel between the surface locations to receive a production conduit therein, the bore hole being drilled by a drill pipe string of connected pipe sections including a leading drill pipe section of a smaller diameter than the diameter of at least the majority of the remaining pipe sections, said method comprising the steps of:
    advancing the small diameter leading drill pipe section with a drill bit thereon in one direction of travel along the arcuate path from a surface entry location to a surface exit location;
    removing the small diameter leading drill pipe section from the drill pipe string after exit from the exit location;
    attaching a reamer and production conduit connected thereto to the drill string at the exit location after the small diameter leading pipe section has been removed;
    pulling the drill string, reamer, and production conduit along the pilot bore hole from the exit location to the earth entry location in an opposite direction of travel with the reamer forming an enlarged opening to receive the production conduit;
    rotating said drill string and reamer during pulling thereof; and
    circulating drilling fluid through said drill string during the drilling and reaming operations.

2. A method for drilling an arcuate underground pilot bore hole along a predetermined arcuate path in one direction of travel between two surface locations defining an entrance and an exit, and then enlarging the pilot bore hole in an opposite direction of travel between the surface locations to receive a production conduit therein, the bore hole being drilled by a drill pipe string of connected pipe sections including a leading drill pipe section of a strength less than the strength of at least the majority of the remaining pipe sections; said method comprising the steps of:
    providing thrusting means at the surface entrance location to advance the drill string and small diameter leading drill pipe section with a drill bit thereon in one direction of travel along the arcuate path;
    circulating drilling fluid through said drill string during the drilling operation;
    removing the small diameter leading drill pipe section from the drill pipe string after exit from the exit location;
    attaching a reamer and production conduit connected thereto to the drill string at the exit location after the small diameter leading pipe section has been removed;
    pulling the drill string, reamer, and production conduit along the pilot bore hole from the exit location to the entry location in an opposite direction of travel with the reamer forming an enlarged opening to receive the production conduit;
    rotating said drill string and reamer during pulling thereof; and
    circulating drilling fluid through said drill string during the reaming operation.

3. A method of drilling an arcuate underground pilot bore hole along a predetermined path between two spaced surface locations utilizing a spud bit on a leading drill pipe section of a drill string with a discharge nozzle in a leading planar front face of the bit directly adjacent the formation to be excavated and eroded; said method comprising the steps of:
    advancing the leading drill pipe section of the drill string having the spud bit thereon with the nozzle in said planar face positioned directly adjacent the formation to be excavated from a surface entry location to a surface exit location;
    and discharging drilling fluid from said nozzle in a jet parallel to but offset from the longitudinal axis of said drill pipe section to aid in guiding the drill pipe section along the predetermined path.

4. The method of drilling an arcuate underground pilot bore hole as set forth in claim 3 and further including the step of providing a predetermined partial rotation of said leading drill pipe section and said spud bit thereby to change the direction of offset and the deviation of the leading drill pipe section.

5. A method of drilling an arcuate underground pilot bore hole along a predetermined path between two spaced surface locations utilizing a spud bit on a leading drill pipe section of a drill string with discharge nozzle means in a leading front face of the bit directly adjacent to the formation to be excavated and eroded; said method comprising the steps of:
    advancing the leading drill pipe section of the drill string having the spud bit thereon with said nozzle means in said front face positioned directly adjacent the formation to be excavated from a surface entrance location to the surface exit location;

discharging drilling fluid from said nozzle means in a jet with the center of the drilling fluid jet being discharged offset from the longitudinal axis of the leading pipe section to aid in guiding the pipe string along the predetermind arcuate path; and providing a predetermined partial rotation of the leading drill pipe section and the spud bit thereby to change the direction of offset of said nozzle means and the deviation of the leading pipe section.

6. A method of drilling an arcuate underground pilot bore hole along a predetermined path between two spaced surface locations utilizing a spud bit on a leading drill pipe section of a drill string with discharge nozzle means in a leading front face of the bit directly adjacent to the formation to be excavated and eroded; said method comprising the steps of:

advancing the leading drill pipe section of the drill string having the spud bit thereon with said nozzle means in said front face positioned directly adjacent the formation to be excavated from a surface entrance location to a surface exit location;

discharging drilling fluid from said nozzle means in a jet with the center of the drilling fluid jet being discharged offset from the longitudinal axis of the leading pipe section to aid in guiding the pipe string along the predetermined arcuate path;

providing a predetermined partial rotation of the leading drill pipe section and the spud bit thereby to change the direction of offset of said nozzle means and the deviation of the leading pipe section;

providing thrusting means at the surface entrance location to advance the drill string and spud bit thereon in a direction of travel along the arcuate path from an entrance opening to an exit opening;

attaching a reamer to the drill string at the exit location;

pulling the drill string and reamer back through the pilot bore hole from the exit opening to the entrance opening in an opposite direction of travel with the reamer forming an enlarged opening;

pushing the reamer back through the reamed hole from said entrance opening to said exit opening;

connecting the production conduit to the reamer at said exit opening; and then pulling the reamer and production conduit back through the reamed opening from said exit opening to said entrance opening for installing the production conduit within the enlarged reamed hole.

7. A method of boring an arcuate underground pilot bore hole along a predetermined path between two spaced surface locations in a single boring operation of a single constant diameter utilizing a drill bit on a leading drill pipe section of a lightweight drill string formed of a flexible high strength non-magnetic alloy material; said method comprising the steps of:

advancing the drill string having the drill bit thereon from a surface entrance location to a surface exit location to form a pilot bore hole of a single constant diameter;

providing means on said drill bit to permit a predetermined deviation of the leading pipe section upon a partial rotation of the leading pipe section a predetermined amount;

discharging drilling fluid from said leading drill pipe section during the boring operation;

removing the drill bit from the drill string at the surface exit location;

attaching a reamer to the drill string at the exit location;

pulling the drill string and reamer back through the pilot bore hole from the exit opening to the entrance opening in an opposite direction of travel while rotating said reamer with the reamer forming an enlarged opening;

pushing the reamer back through the reamed hole from said entrance opening to said exit opening;

connecting the production conduit to the reamer at said exit opening to permit rotation of the reamer relative to the production conduit;

then pulling the reamer and production conduit back through the reamed opening from said exit opening to said entrance opening for installing the production conduit within the enlarged reamed hole; and rotating said drill string and reamer relative to the production conduit during pulling of the reamer and production conduit.

8. A method for drilling an arcuate underground pilot bore hole along a predetermined arcuate path in one direction of travel between two surface locations defining an entrance and an exit in a single drilling operation of a single constant diameter, and then enlarging the pilot bore hole in an opposite direction of travel between the surface locations to receive a production conduit therein, the bore hole being drilled by a drill pipe string of connected pipe sections having leading end sections formed of high strength non-magnetic material and having an outer diameter of at least around three inches, said drill pipe string including a leading drill pipe section, electrical survey equipment within the leading pipe section, and a drill bit on the end of the leading pipe section; said method comprising the steps of:

providing thrusting means at the surface entrance location to advance the drill string and leading end section in one direction of travel along the arcuate path;

providing means on said drill bit to permit a predetermined deviation of the leading pipe section upon a partial rotation of the leading pipe section a predetermined amount;

circulating drilling fluid through said drill string during the drilling operation;

removing the drill bit from the drill pipe string after exit from the exit location;

attaching a reamer to the drill string at the exit location after the drill bit has been removed;

pulling and simultaneously rotating the drill string and reamer along the pilot bore hole from the exit location to the entry location in an opposite direction of travel with the reamer forming an enlarged opening adapted to receive a production conduit; and circulating drilling fluid through said drill string during the reaming operation.

9. A method of drilling an arcuate underground pilot bore hole along a predetermined arcuate path in one direction of travel between two spaced surface locations in a single drilling operation of a single constant diameter, and then enlarging the pilot bore hole in an opposite direction of travel between the surface locations to receive a production conduit therein, the bore hole being drilled by a drill pipe string of connected pipe sections formed by high strength non-magnetic material, said drill pipe string including a leading drill pipe section, electrical survey equipment within the leading pipe section, a drill bit on the end of the leading pipe section, and an in-hole hydraulic motor having a longitudinal axis offset from the longitudinal axis of the drill pipe string for rotating the drill bit; said method comprising the steps of:

advancing the leading drill pipe section carrying the drill bit and in-hole hydraulic motor along the arcuate path from a surface entry location to a surface exit location;

providing a drive shaft between the drill bit and in-hole hydraulic motor for rotating the drill bit along the arcuate path between the two surface locations;

providing a predetermined deviation of the leading pipe section upon a partial rotation of the leading drill pipe section and in-hole motor a predetermined amount;

circulating drill fluid through the drill string to the hydraulic motor and drill bit for driving the hydraulic motor and providing drilling fluid for the drilling operation;

removing the leading pipe sections with the drill bit and in-hole hydraulic motor from the drill string after exit from the surface exit location;

attaching a reamer to the drill string at the exit location after removal of the leading pipe section; and pulling and simultaneously rotating the drill string and reamer along the pilot bore hole from the exit location to the entry location in an opposite direction of travel with the reamer forming an enlarged opening adapted to receive a production conduit.

10. A method of drilling an arcuate underground pilot bore hole along a predetermined path between two spaced surface locations utilizing a spud bit on a leading drill pipe section of a drill string with discharge nozzle means in a leading front face of the bit directly adjacent to the formation to be excavated and eroded; said method comprising the steps of:

advancing the leading drill pipe section of the drill string having the spud bit thereon with said nozzle means in said front face positioned directly adjacent the formation to be excavated from a surface entrance location to a surface exit location;

discharging drilling fluid from said nozzle means in a jet with the center of the drilling fluid jet being discharged offset from the longitudinal axis of the leading pipe section to aid in guiding the pipe string along the predetermined arcuate path;

providing a predetermined partial rotation of the leading drill pipe section and the spud bit thereby to change the direction of offset of said nozzle means and the deviation of the leading pipe section.

providing thrusting means at the surface entrance location to advance the drill string and spud bit thereon in a direction of travel along the arcuate path from an entrance opening to an exit opening;

attaching a production conduit to the drill string at the exit location; and pulling the drill string and production conduit back through the bore hole from the exit opening to the entrance opening in an opposite direction of travel.

11. Apparatus for drilling an arcuate underground pilot bore hole along a predetermined inverted arcuate path between two spaced earth surface locations; said apparatus comprising:

a drill pipe string including a plurality of connected pipe sections extending from one surface location into a bore entrance opening of the pilot bore hole;

means at said one surface location to apply a thrust on said pipe string;

said drill pipe string having a leading pipe section with a drill bit thereon and being of a flexibility greater than the other pipe sections; and, means to circulate drilling fluid during the drilling operation.

12. Apparatus as set forth in claim 11 wherein the increased flexibility of said leading pipe section is achieved by said leading pipe section being of a diameter less than the other pipe sections.

13. Apparatus as set forth in claim 12 wherein a crossover sub connects the leading pipe section with the adjacent pipe section.

14. Apparatus as set forth in claim 12 wherein both the leading pipe section and the immediately adjacent pipe section have a diameter less than the remainder of the pipe sections thereby to form a relatively long length flexible end for the drill string.

15. Apparatus as set forth in claim 12 wherein the diameter of the leading pipe section is less than around three (3) inches and the diameter of the regular drill pipe sections is more than around three (3) inches.

16. Apparatus for drilling an arcuate underground pilot bore hole along a predetermined inverted arcuate path between two spaced surface locations in one direction of travel, and then reaming an enlarged opening along the pilot bore hole in an opposite direction of travel while simultaneously placing a production conduit therein; said apparatus comprising:

a drill pipe string including a plurality of threaded connected pipe sections extending from one surface location into a bore entrance opening of the pilot bore hole, said string including pipe sections of different strengths and a leading pipe section with a drill bit thereon;

means at said one surface location applying a thrust on said pipe string in said one direction of travel to force said pipe string in a thrust action along the arcuate path in said one direction of travel to an exit opening at the other surface locations;

means to circulate drilling fluid through said drill string during the drilling operation;

a reamer connected to said drill string at the other surface location after the pilot bore hole is drilled between said spaced surface locations to form an enlarged opening along the pilot bore hole;

a production conduit connected to said reamer and following said reamer through the enlarged opening formed by the reamer;

said means at said one surface location including means for pulling said drill string, said reamer, and said production conduit along the enlarged opening in an opposite direction of travel, said pulling means at said one surface location rotating said drill string and reamer simultaneously with the pulling action; and said means to circulate drilling fluid providing drilling fluid for said reamer during the reaming operation.

17. Apparatus as set forth in claim 16 wherein said pipe sections adjacent said means applying a thrust are of a greater strength than the pipe section at the leading end of said pipe string.

18. Apparatus as set forth in claim 16 wherein the drill bit on said leading pipe section comprises a spud bit.

19. Apparatus as set forth in claim 16 wherein a swivel connects said reamer and said production conduit to each other to permit relative rotation therebetween.

20. Apparatus for drilling an arcuate underground pilot bore hole along a predetermined inverted arcuate path between two spaced earth surface locations; said apparatus comprising:
- a drill pipe string including a plurality of connected pipe sections extending from one surface location into a bore entrance opening of the pilot bore hole;
- means at said one surface location to apply a thrust on said pipe string;
- said drill pipe string having a leading pipe section with a drill bit thereon and being of a strength less than the pipe sections adjacent said means to apply a thrust; and
- means to circulate drilling fluid through said drill pipe during the drilling operation.

21. Apparatus as set forth in claim 20 wherein said leading pipe section is of a smaller diameter than the diameter of the pipe sections adjacent said means to apply a thrust.

22. Apparatus as set forth in claim 20 wherein said leading pipe section is of the same diameter as the remaining pipe sections but has a decreased wall thickness.

23. Apparatus as set forth in claim 20 wherein said leading pipe section is of the same diameter as the remaining pipe sections but formed of a more flexible high strength material than at least the majority of the remaining pipe sections.

24. Apparatus for drilling an arcuate underground pilot bore hole along a predetermined inverted arcuate path between two spaced surface locations in one direction of travel, and then reaming an enlarged opening along the pilot bore hole in an opposite direction of travel while simultaneously placing a production conduit therein; said apparatus comprising:
- a drill pipe string including a plurality of threaded connected pipe sections extending from one surface location into a bore entrance opening of the pilot bore hole, said string including pipe sections of different strengths and a leading pipe section with a drill bit thereon;
- at least some of the leading pipe sections being of a reduced strength relative to at least some of the trailing pipe sections, and at least some of the leading pipe sections being of an increased flexibility relatively to at least some of the trailing pipe sections;
- means at said one surface locaton applying a thrust on said pipe string in said one direction of travel to force said pipe string in a thrust action along the arcuate path in said one direction of travel to an exit opening at the other surface location;
- means to circulate drilling fluid through said drill string during the drilling operation;
- a reamer connected to said drill string at the other surface location after the pilot bore hole is drilled between said spaced surface locations to form an enlarged opening along the pilot bore hole;
- a production conduit connected to said reamer and following said reamer through the enlarged opening formed by the reamer;
- said means at said one surface location including means for pulling said drill string, said reamer, and said production conduit along the enlarged opening in an opposite direction of travel, said pulling means at said one surface location rotating said drill string and reamer simultaneously with the pulling action; and
- means operatively connecting the production conduit to the reamer;
- said means to circulate drilling fluid providing drilling fluid for said reamer during the reaming operation.

25. Apparatus as set forth in claim 24 wherein the majority of the pipe sections in said pipe string have a diameter over around three (3) inches.

26. Apparatus for drilling an arcuate underground pilot bore hole along a predetermined inverted arcuate path between two spaced surface locations in one direction of travel, and then reaming an enlarged opening along the pilot bore hole in an opposite direction of travel while simultaneously placing a production conduit therein; said apparatus comprising:
- a drill pipe string including a plurality of threaded connected pipe sections extending from one surface location into a bore entrance opening of the pilot bore hole, said string including pipe sections of different strengths and a leading pipe section with a spud bit thereon;
- said spud bit having a planar forward end portion forming a flat front face thereof, said flat face having a discharge opening for receiving and discharging high velocity drilling fluid directly into the adjacent formation, and an intermediate planar portion slanting rearwardly from said front face for riding along the surface of the bore hole;
- means at said one surface location applying a thrust on said pipe string in said one direction of travel to force said pipe string in a thrust action along the arcuate path in said one direction of travel to an exit opening at the other surface location;
- means to circulate drilling fluid through said drill string during the drilling operation;
- a reamer connected to said drill string at the other surface location after the pilot bore hole is drilled between said spaced surface locations to form an enlarged opening along the pilot bore hole; and
- a production conduit connected to said reamer and following said reamer through the enlarged opening formed by the reamer;
- said means at said one surface location including means for pulling said drill string, said reamer, and said production conduit along the enlarged opening in an opposite direction of travel, said pulling means at said one surface location rotating said drill string and reamer simultaneously with the pulling action;
- said means to circulate drilling fluid providing drilling fluid for said reamer during the reaming operation.

27. Apparatus for drilling a pilot bore hole as set forth in claim 21 wherein an arcuate shoe is secured to the outer periphery of the leading pipe section adjacent said spud bit for riding along a surface of the bore hole.

28. Apparatus for drilling a pilot bore hole as set forth in claim 27 wherein said spud bit has a lower planar shoulder adjacent said arcuate shoe for riding along a surface of the bore hole.

29. Apparatus for drilling a pilot bore hole along a predetermined underground arcuate path between two spaced surface locations comprising:
- a drill pipe string including a plurality of connected drill pipe sections extending from one surface location into a bore entrance opening of the pilot bore hole and having a leading pipe section;
- means at said one surface location to apply an axial thrust to said pipe string;
- means to circulate drilling fluid through said drill pipe string during the drilling operation; and
- a spud bit on the leading pipe section of said pipe string having a leading end face thereon and fluid discharge nozzle means on said end face for discharging drilling fluid in a jet offset from the longitudinal axis of said leading pipe section to aid in guiding the pipe string along the predetermined arcuate path, said leading drill pipe section and said spud bit adapted to be partially rotated a predetermined amount to change the deviation of offset of said nozzle means and the deviation of the leading drill pipe section.

30. Apparatus for drilling a pilot bore hole as set forth in claim 29 wherein an arcuate shoe is secured to the outer periphery of the leading pipe section adjacent said spud bit for riding along the surface of the bore hole opposite the desired direction of deviation.

31. Apparatus for drilling a pilot bore hole as set forth in claim 29 wherein said spud bit has a lower planar shoulder adjacent said arcuate shoe for riding along the surface of the bore hole opposite the desired direction of deviation.

32. Apparatus for drilling an arcuate underground pilot bore hole along a predetermined inverted arcuate path between two spaced surface locations in one direction of travel, and then reaming an enlarged opening along the pilot bore hole in an opposite direction of travel for receiving a production conduit therein; said apparatus comprising:
- a drill pipe string including a plurality of connected threaded pipe sections extending from one surface location into a bore entrance opening of the pilot bore hole, the drill pipe string including a leading pipe section having a spud bit with a leading front face thereon;
- fluid discharge nozzle means on said front face for discharging drilling fluid in a jet having its center offset from the longitudinal axis of said leading pipe section to aid in guiding the pipe string along the predetermined arcuate path, said leading drill pipe section and said spud bit adapted to be partially rotated in a predetermined amount to change the directional offset of said nozzle means and the deviation of the leading drill pipe section;
- means at said one surface location applying a thrust on said pipe string in said one direction of travel to force said pipe string in a thrust action along the arcuate path in said one direction of travel to an exit opening at the other surface location;
- means to circulate drilling fluid through said drill string during the drilling operation;
- a reamer connected to said drill string at the other surface location after the pilot bore hole is drilled between said spaced surface locations and after removal of the spud bit from the drill string;
- said means at said one surface location including means for pulling said drill string and said reamer along the pilot bore hole in the opposite direction of travel to form an enlarged opening for receiving a production conduit, said pulling means rotating said drill string and reamer simultaneously with the pulling action.

33. Apparatus for drilling an arcuate underground pilot bore hole as set forth in claim 32 wherein the leading front face of said spud bit is a planar face extending in a plane generally transversely of the longitudinal axis of the drill string and having a plurality of discharge nozzles therein for discharging drilling fluid in streams directly against the formation, the center of the mass of discharged fluid being offset from the longitudinal axis of the drill string.

34. Apparatus for drilling an arcuate underground pilot bore hole as set forth in claim 32 wherein the leading front face of said spud bit is a planar face extending in a plane generally transversely of the longitudinal axis of the drill string, and said spud bit has an inclined planar lower surface extending from said planar front face and adapted to ride along the lower surface of the pilot bore hole.

35. Apparatus for drilling an arcuate underground pilot bore hole along a predetermined inverted arcuate path between two spaced earth surface locations; said apparatus comprising:
- a lightweight drill pipe string including a plurality of connected pipe sections extending from one surface location into a bore entrance opening of the pilot bore hole, each pipe section being of a high strength flexible non-ferrous alloy sufficient to permit a deflection of around five (5) degrees;
- means at said one surface location to apply an axial thrust to said pipe string;
- a spud bit on the leading pipe section of said drill pipe string having a leading front face thereon and forming said pilot bore hole of a single constant diameter, said front face having a discharge opening for receiving and discharging high velocity drilling fluid directly into the adjacent formation;
- means at said one surface location applying a thrust on said pipe string in said one direction of travel to force the pipe string in a thrust action along the arcuate path in said one direction of travel to an exit opening at the other surface location;
- means associated with said spud bit for changing the deviation of the leading drill pipe section upon a partial rotation of said spud bit and leading drill pipe section a predetermined amount;
- means to circulate drilling fluid through said drill string during the drilling operation to provide drilling fluid through the fluid discharge opening in said spud bit; and
- a reamer connected to the drill string at the other surface location after the pilot bore hole of a single constant diameter is drilled between said spaced surface locations;
- said means at said one surface location including means for pulling said drill string and said reamer in an opposite direction of travel along the pilot bore hole from said exit opening to said entrance opening to enlarge the pilot bore hole for receiving a production conduit, said means to circulate drilling fluid providing drilling fluid for said reamer during the reaming operation.

36. Apparatus as set forth in claim 35 wherein means at said one surface location applying a thrust on said drill string in said one direction of travel is utilized to push said reamer back through the reamed hole from said entrance opening to said exit opening;

means at said exit opening to connect the production conduit to said reamer;

said pulling means then pulling said reamer and said production conduit connected to said reamer from said exit opening back through the enlarged opening formed by the reamer thereby to install production conduit in the reamed hole after it has been completely reamed with all obstructions removed before the production conduit is initially positioned within the enlarged opening.

37. Apparatus for drilling an arcuate underground pilot bore hole along a predetermined arcuate path between two spaced earth surface locations; said apparatus comprising:

a lightweight drill pipe string including a plurality of connected drill pipe sections extending from one surface location into a bore entrance opening of the pilot bore, each drill pipe section being formed of a high strength aluminum alloy material and being of a flexibility to permit a deflection of around five (5) degrees;

a separate high strength steel tool joint threaded onto each end of the aluminum drill pipe sections to form a male end on one end of the drill pipe section and a mating female end on the other end of the drill pipe section, the steel tool joints on adjacent aluminum drill pipe sections being threadedly connected to each other to form a high strength steel connection between adjacent aluminum drill pipe sections;

a drilling bit on the leading end of the drill string for forming the pilot bore hole of a single constant diameter along the arcuate path from said bore entrance opening to a bore exit opening;

a reamer connected to the drill string at the bore exit opening after the single diameter pilot bore hole is drilled between said spaced surface locations for enlarging the pilot bore hole; and means at said one surface location providing power for driving said drilling bit between said entrance opening and said exit opening, and for driving said reamer between said exit opening and said entrance opening to enlarge the pilot bore hole for receiving a production conduit.

38. Apparatus for drilling an arcuate underground pilot bore hole as set forth in claim 37 wherein said drilling bit is a spud bit and said means for driving said drilling bit pushes said spud bit along the arcuate path in a thrust action.

39. Apparatus for drilling an arcuate underground pilot bore hole as set forth in claim 37 wherein said drill pipe sections have an inner diameter over around three (3) inches and an outer diameter over around four (4) inches.

40. Apparatus for boring an arcuate underground pilot bore hole along a predetermined inverted arcuate path between two spaced surface locations in one direction of travel in a single boring operation of a single constant diameter, and then reaming an enlarged opening along the pilot bore hole in an opposite direction of travel for receiving a production conduit therein; said apparatus comprising:

a lightweight drill pipe string including a plurality of threaded connected pipe sections having a diameter of at least around three (3) inches and extending from one surface location into a bore entrance opening of the pilot bore hole, said string being formed of a flexible high strength, non-ferrous material and including a leading pipe section having electrical survey equipment therein and a drill bit thereon;

means associated with said bit for changing the deviation of the leading drill pipe section upon a partial rotation of the drill bit and leading pipe section a predetermined amount;

means at said one surface location applying a thrust on said pipe string in said one direction of travel to force said pipe string in a thrust action along the arcuate path in said one direction of travel to an exit opening at the other surface location;

means to circulate drilling fluid through said drill string during the boring operation;

a reamer connected to said drill string at the other surface location after the pilot bore hole is bored between said spaced locations to form an enlarged opening along the pilot bore hole;

a production conduit at said other surface location adapted to be connected to said reamer and to follow said reamer through the enlarged opening formed by the reamer;

said means at said one surface location including means for pulling said drill string, said reamer, and said production conduit along the enlarged opening in an opposite direction of travel, said pulling means at said one surface location rotating said drill string and reamer simultaneously with the pulling action; and said means to circulate drilling fluid providing drilling fluid for said reamer during the reaming operation.

41. Apparatus as set forth in claim 40 wherein the drill bit on said leading pipe section comprises a spud bit.

42. Apparatus as set forth in claim 40 wherein a swivel connects said reamer and said production conduit to each other to permit relative rotation therebetween.

43. Apparatus as set forth in claim 40 wherein said reamer simultaneously forms said enlarged opening along the pilot bore hole and pulls said production conduit within the enlarged opening.

44. Apparatus as set forth in claim 40 wherein said reamer forms said enlarged opening in a first travel pass along the pilot bore hole and then pulls said production conduit within the enlarged opening in a second travel pass along the enlarged opening.

45. Apparatus as set forth in claim 40 wherein the drill bit on said leading pipe section is a rotary drill bit.

46. Apparatus as set forth in claim 45 wherein said leading pipe section includes an in-hole hydraulic motor for rotating said rotary drill bit.

47. Apparatus for boring an arcuate underground pilot bore hole along a predetermined inverted arcuate path between two spaced surface locations in one direction of travel in a single boring operation of a single constant diameter, and then reaming an enlarged opening along the pilot bore hole in an opposite direction of travel for receiving a production conduit therein; said apparatus comprising:

a lightweight drill pipe string including a plurality of threaded connected pipe sections extending from one surface location into a bore entrance opening of the pilot bore hole, at least the leading pipe section being formed of a high strength non-magnetic flexible alloy material to permit a deflection of at least around five (5) degrees and having a diameter of at least around three (3) inches, and electronic survey equipment within the leading pipe section;

means at said one surface location applying a thrust on said pipe string in said one direction of travel to force said pipe string in a thrust action along the arcuate path in said one direction of travel to an exit opening at the other surface location;

a reamer connected to said drill string at the other surface location after the pilot bore hole is bored between said spaced surface locations to form an enlarged opening along the pilot bore hole;

a production conduit at said other surface location adapted to be connected to said reamer and to follow said reamer through the enlarged opening formed by the reamer;

said means at said one surface location including means for pulling said drill string, said reamer, and said production conduit along the enlarged opening in an opposite direction of travel, said pulling means at said one surface location rotating said drill string and reamer simultaneously with the pulling action; and means to circulate drilling fluid through said drill string during the boring and reaming operations.

48. Apparatus as set forth in claim 47 wherein means at said one surface location applying a thrust on said drill string in said one direction of travel is utilized to push said reamer back through the reamed hole from said entrance opening to said exit opening;

said pulling means then pulling said reamer and said production conduit connected to said reamer from said exit opening back through the enlarged opening formed by the reamer thereby to install production conduit in the reamed hole after it has been completely reamed with all obstructions removed before the production conduit is initially positioned within the enlarged opening.

49. Apparatus for drilling an arcuate underground pilot bore hole along a predetermined inverted arcuate path between two spaced surface locations in one direction of travel, and then pulling a production conduit along the bore hole in an opposite direction of travel; said apparatus comprising:

a drill pipe string including a plurality of connected threaded pipe sections extending from one surface location into a bore entrance opening of the pilot bore hole, the drill pipe string including a leading pipe section having a spud bit with a leading front face thereon;

fluid discharge nozzle means on said front face for discharging drilling fluid in a jet having its center offset from the longitudinal axis of said leading pipe section to aid in guiding the pipe string along the predetermined arcuate path, said leading drill pipe section and said spud bit adapted to be partially rotated in a predetermined amount to change the directional offset of said nozzle means and the deviation of the leading drill pipe section;

means at said one surface location applying a thrust on said pipe string in said one direction of travel to force said pipe string in a thrust action along the arcuate path in said one direction of travel to an exit opening at the other surface location;

means to circulate drilling fluid through said drill string during the drilling operation; and a production conduit connected to said drill string at the other surface location after the pilot bore hole is drilled between said spaced surface locations and after removal of the spud bit from the drill string;

said means at said one surface location including means for pulling said drill string and said production conduit through the bore hole in the opposite direction of travel.

50. Apparatus for boring an arcuate underground pilot bore hole along a predetermined inverted arcuate path between two spaved surface locations in one direction of travel in a single boring operation of a single constant diameter, and then pulling a production conduit along the bore hole in an opposite direction of travel; said apparatus comprising:

a lightweight drill pipe string including a plurality of threaded connected pipe sections having a diameter of at least around three (3) inches and extending from one surface location into a bore entrance opening of the pilot bore hole, said string being formed of a flexible high strength, non-ferrous material and including a leading pipe section having electrical survey equipment therein and a drill bit thereon;

means associated with said bit for changing the deviation of the leading drill pipe section upon a partial rotation of the drill bit and leading pipe section a predetermined amount;

means at said one surface location applying a thrust on said pipe string in said one direction of travel to force said pipe string in a thrust action along the arcuate path in said one direction of travel to an exit opening at the other surface location;

means to circulate drilling fluid through said drill string during the boring operation; and a production conduit at said other surface location connected to said drill string after removal of said drill bit;

said means at said one surface location including means for pulling said drill string, and said production conduit along the bore hole in an opposite direction of travel.

* * * * *

UNITED STATES PATENT AND TRADEMARK OFFICE
CERTIFICATE OF CORRECTION

PATENT NO. : 4,679,637

DATED : July 14, 1987

INVENTOR(S) : Martin D. Cherrington, William D. Cherrington

It is certified that error appears in the above–identified patent and that said Letters Patent are hereby corrected as shown below:

```
Column 1,  line 23, before "relatively" insert -- a --;
           line 41, delete "light weight" and insert
                    therefor -- lightweight --.
Column 3,  line 18, delete "t" and insert therefor -- to --.
Column 5,  line 21, delete "ar" and insert therefor
                    -- are --.
Column 6,  line 5, delete "This" and insert therefor
                    -- Thus --.
Column 7,  line 60, delete the comma ",", second occurrence.
Column 11, line 5, delete "axis" and insert therefor
                    -- axial --.
Column 13, line 2, delete "the" and insert therefor
                    -- a --.
Column 24, line 23, delete "spaved" and insert therefor
                    -- spaced --.

Column 15, line 55, delete the period "." and insert there-
                    for -- ; --.
```

Signed and Sealed this

Second Day of February, 1988

*Attest:*

DONALD J. QUIGG

*Attesting Officer*   *Commissioner of Patents and Trademarks*